United States Patent [19]

Blount

[11] 4,200,697
[45] Apr. 29, 1980

[54] PROCESS FOR THE PRODUCTION OF POLYESTER SILICATE PLASTICS

[76] Inventor: David H. Blount, 5450 Lea St., San Diego, Calif. 92105

[21] Appl. No.: 10,061

[22] Filed: Feb. 7, 1979

Related U.S. Application Data

[63] Continuation-in-part of Ser. No. 951,573, Oct. 16, 1978, which is a continuation-in-part of Ser. No. 794,915, May 9, 1977, Pat. No. 4,125,498, which is a continuation-in-part of Ser. No. 652,727, Jan. 30, 1976, abandoned, which is a continuation-in-part of Ser. No. 562,201, Apr. 14, 1975, abandoned.

[51] Int. Cl.$^2$ .............................. C08F 2/00; C08F 6/00
[52] U.S. Cl. ............................ 521/83; 260/18 S; 260/40 R; 521/91; 521/93; 521/96; 521/100; 521/114; 521/116; 521/117; 521/122; 521/124; 521/130; 528/176; 528/192; 528/205; 528/206; 528/308; 528/309; 528/425
[58] Field of Search .................. 521/83, 91, 93, 96, 521/100, 114, 116, 117, 122, 124, 130; 528/176, 192, 205, 206, 308, 309, 425; 260/40 R, 18 S

[56] References Cited

U.S. PATENT DOCUMENTS 4,125,498  11/1978  Blount .............................. 260/18 S

*Primary Examiner*—Melvyn I. Marquis

[57] ABSTRACT

Unsaturated polyester resins will form foamed or solid plastics with water-binding agents containing an oxidated silicon compound in the presence of an initiator.

9 Claims, No Drawings

PROCESS FOR THE PRODUCTION OF POLYESTER SILICATE PLASTICS

CROSS-REFERENCE TO RELATED APPLICATIONS

This application is a continuation-in-part of my co-pending U.S. patent application, Ser. No. 951,573, filed Oct. 16, 1978, which is a continuation-in-part of U.S. patent application, Ser. No. 794,915, filed May 9, 1977, now U.S. Pat. No. 4,125,498, which is a continuation-in-part of U.S. patent application, Ser. No. 652,727, filed Jan. 30, 1976, now abandoned, which is a continuation-in-part of U.S. patent application, Ser. No. 562,201, filed Apr. 14, 1975, now abandoned.

BACKGROUND OF THE INVENTION

This invention relates to a process for the production of polyester silicate foamed or solid plastics which have high strength, elasticity, wear resistance, good thermostability and good fire-resistant characteristics. The solid inorganic-organic plastics have the physical properties similar to polyester plastics such as high strength, wear resistance and water resistance, but are less expensive, due to the high percentage of oxidated silicon compounds and warter-binding agents that may be used. The foamed polyester silicate plastics have high strength, good water and wear resistance and good thermal- and sound-insulation properties.

The polyester silicate plastics which are produced by the process of this invention are characterized by high strength, elasticity, dimensional stability and flame resistance and are produced by mixing:

(a) an unsaturated polyester resin (a solution of an unsaturated linear polymer and a liquid monomer that is capable of copolymerizing with the linear polymer);
(b) an initiator, such as an organic peroxide;
(c) a water-binding agent containing an oxidated silicon compound or mixed with one;
(d) water;

and, optionally, also other auxiliary agents and additives which may be added.

The proportion, by weight, of Component (a) to (c) is preferably from 70:30 to 15:80. The Component (c) needs to be only a catalytic amount which varies with each initiator. The quantity of Component (d) may vary, depending on the water-binding agent, but is generally in the ratio of 1 to 4 parts by weight to 4 parts by weight of Component (c).

In the process according to the invention, therefore, novel inorganic-organic plastics are produced when water is combined with a mixture of:

(a) an unsaturated polyester resin,
(b) an initiator,
(c) a water-binding agent containing an oxidated silicon compound or mixed with one, and, optionally, further auxiliaries and additives. The system thus obtained is allowed to reset to completion.

Component (a)

Any suitable unsaturated polyester resin may be used according to the invention. It is generally preferred to use commercially readily available unsaturated polyester polymers which usually contain a polymerable organic compound and a catalyst to catalyze the initiator (Component (b)).

The terms "polyester", "polyester resins" or "unsaturated polyester resins" technically refer to a solution of an unsaturated linear polymer in a liquid monomer that is capable of copolymerizing with the linear polymer. For the purpose of this invention, the term "unsaturated polyester resin" will mean a solution of an unsaturated linear polymer in a liquid monomer that is capable of copolymerizing with the linear polymer.

The production of unsaturated polyester polymers and/or resins is well known in the arts and a detailed description of their production will not be given in this specification. Suitable unsaturated polyester polymers and/or resins are described, e.g., by Brage Golding in Polymers and Resins, 1959, published by D. Van Nostrand Company, Inc., Princeton, N.J., Toronto, London and New York, pages 283 to 313.

Most unsaturated polyester resins consist of a solution of an alkyd resin, prepared, for example, from propylene glycol, maleic acid and adipic acid or from diethylene glycol, tetrahydrophthalic anhydride and fumaric acid, in 30% of its weight of styrene. An inhibitor such as a quaternary ammonium salt is added to prevent polymerization before use. Just prior to use, an initiator such as a peroxide initiator, e.g., benzoyl peroxide or t-butylhydroperoxide, is added, together with a catalyst such as cobalt or manganese salt as a promoter. Wide variations in the composition of the alkyd resin are possible, and other liquid monomers, such as allyl phthalate or mixtures of styrene with vinyl acetate, methyl methacrylate, or vinyl toluene, may be used as the solvent. Reagents that add to the double bond of other $\alpha,\beta$-unsaturated acids also add to maleic and fumaric acids and their derivatives. $\alpha,\beta$-unsaturated acids are readily available. The most important $\alpha,\beta$-unsaturated compound from a technical viewpoint are acrylonitrile, methyl acrylate and methyl methacrylate. The $\alpha,\beta$-unsaturated acids are usually made by the oxidation of an $\alpha,\beta$-unsaturated aldehyde, $\alpha,\beta$-unsaturated esters and nitriles with these reagents with even greater ease than $\alpha,\beta$-unsaturated acids, especially when the reaction is catalyzed by bases. The $\beta$-aryl-substituted $\alpha,\beta$-unsaturated acids may be obtained by the Perkin Synthesis (an aldol-type addition of anhydrides to aromatic aldehydes). $\alpha,\beta$-unsaturated acids are described, e.g., in Textbook of Organic Chemistry by Carl R. Noller, published by W. B. Saunders Co., Philadelphia and London, 1966, pages 202, 463, 618 and 619.

The unsaturated polyester resins are also known as contact and low-pressure laminating resins. Commercially they are sold as polyester boat resins, polyester laminating resins, polyester casting resins, etc., and usually contain a catalyst as a promoter for an initiator which comes separately and is added at the time it is to be used.

Long-chain unsaturated polyester resins may be made from dibasic acids and dihydric alcohols. Either the dibasic acid or the dihydric alcohol may be unsaturated. Usually a combination of unsaturated and saturated dibasic acids and dihydric alcohols is used to produce the unsaturated polyester resins. Instead of the dibasic acids, the corresponding polycarboxylic acid esters of lower alcohols or their mixtures may be used for preparing the unsaturated polyester resins.

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebacic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bisglycol terephthalate. An unsaturated dibasic acid such as maleic acid, maleic acid anhydride, fumaric acid, itaconic acid or mixtures thereof must be included in the production of unsaturated polyester resins, except when an unsaturated alcohol is used.

Suitable dihydric alcohols include but are not limited to, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methyl-propane-1,3-diol; diethylene glycol; triethylene glycol; tetraethylene glycol; polyethylene glycols; dipropylene glycol; polypropylene glycols; dibutylene glycol and polybutylene glycols. The unsaturated polyester resins may contain lactones such as ε-caprolactone, or hydrocarboxylic acids such as ω-hydroxy-caproic acid. Polyethers containing 2-hydroxyl groups may be used in production of unsaturated polyester resins and may be prepared, e.g., by the polymerization of epoxides, e.g., ethylene oxide, propylene oxide, butylene oxide, tetrahydrofuran, styreneoxide or epichlorohydrin, each with itself, e.g., in the presence of $BF_3$, or by addition of these epoxides, optionally as mixtures or successively, to starting components such as alcohols or amines, e.g., water; ethylene glycol; propylene-1,3- or -1,2-glycol; trimethylol propane; 4,4'-dihydroxydiphenylpropane; aniline; ammonia; ethanolamine or ethylenediamine. The polyethers may be modified with vinyl polymers such as those which may be obtained by polymerizing styrene or acrylonitrile in the presence of polyethers.

The unsaturated polyester resins may be modified with polyacetals, polyester amides, polyamides, organic diisocyanates, natural polyols, e.g., castor oil and additional products of alkylene oxides with phenoformaldehyde resins or with ureaformaldehyde resins.

The unsaturated polyester resins may be modified by polymerable oils such as unsaturated fatty acids (or their esters), tung oil linseed oil, heated linseed oil, soya bean oil, dehydrated castor oil, tall oil, cottonseed oil, sunflower oil, fish oil, perilla oil and safflower oil.

Suitable unsaturated alcohols such as allyl alcohol may be reacted with dibasic acids such as phthalic anhydride, succinic acid, maleic acid, maleic anhydride, itaconic acid and fumeric acid to produce allyl esters which may be polymerized alone or with other polymerizing monomers. Allyl esters such as diethylene glycol bis(allyl carbonate), diallyl maleate, diallyl fumarate, diallyl phthalate, diallyl benzene phosphonate, allyl itaconate and methallyl methacrylate may be used in this invention. Triallyl cyanurate may be reacted with unsaturated polyester resins to produce resins, and may be used as the polymerizing monomer.

Other unsaturated alcohols may be reacted with dibasic acids; these include other polymeric allyl-type alcohols which are alcohols having a double bond of aliphatic character between two carbon atoms, one of which is attached directly to a saturated carbon atom, which, in turn, is attached directly to an alcoholic hydroxyl group, as represented by the general structural formula:

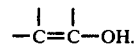

Alcohols embodying this structure may properly be termed "beta, gamma-olefinic monohydric alcohols." Allyl-type alcohols having a terminal methylene group attached by an olefinic double bond to a carbon atom which is attached directly to a saturated carbinol carbon are represented by the formula:

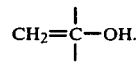

The alcohols falling within this class are otherwise identified as beta, gamma-monolefinic monohydric alcohols having a terminal methylene group. Allyl-type alcohols include, but are not limited to, allyl alcohol; methallyl alcohol; ethallyl alcohol; chloroallyl alcohol; buten-1-ol-3; penten-1-ol-3; hexen-1-ol-3; 3-methyl-buten-1-ol-3; 3-methyl-penten-1ol-3; 2-methyl-buten-1-ol-3; 2-methyl penten-1-ol-3; 2,3-dimethyl-butene-1-ol-3; hepten-1-ol-3; etc.

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc.

Activators and promoters, used in conjunction with the initiators such as cobalt which, in the form of its ethyl hexanoate or naphthenate salt, is a good, general-purpose activator for use with ketone peroxides, may be added to the unsaturated polyester resin. Concentration as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such as p-tert-butyl catechol, hydroquinone, p-nitrose dimethylaniline or similar compounds which will increase the lifetime of the unsaturated polyester resin, may be added to the unsaturated polyester resin.

Component (b)

Any suitable initiator which will promote the copolymerization of a solution of an unsaturated linear polymer in a liquid monomer may be used in this invention. The controlled polymerization of unsaturated polyester-monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate, and mixtures thereof.

Promoters used with acyl peroxide include tertiary dialkyl aryl amines, such as diethyl aniline, and aliphatic thiols, as for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention.

Component (c)

Water-binding components may be used according to the invention which include organic or inorganic water-binding substances which have, first, the ability to chemically combine, preferably irreversibly, with water and, second, the ability to reinforce the polyester silicate plastic end products of the invention. The most preferred water-binding agents of the invention hold the water chemically bound until heated sufficiently, as in a fire. Thus, in a fire, the water is released and extinguishes the fire. The term "water-binding component" is used herein to identify a material, preferably granular or particulate, which is sufficiently anhydrous to be capable of absorbing water to form a solid or gel such as mortar or hydraulic cement. This component may be a mineral or chemical compound which is anhydrous, such as CaO and $CaSO_4$, but may exist as a partial hydrate. The water-binding components preferably used are inorganic materials such as hydraulic cements, synthetic anhydrite, gypsum or burnt lime. It is preferred that the water-binding component contain an oxidated silicon compound or that one should be added with the components.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set a hard product by admixture of water, and which combines chemically with the other ingredients to form a hydrate, may be used. The most preferred forms of water-binding agents to be used according to the invention are those materials which are normally known as cement. In other words, they are normally powdered materials with which water normally forms a paste which hardens slowly and may be used to bind intermixed crushed rock or gravel and sand into rockhard concrete. There are so many different kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684 to 710, as well as in other well-known references in this field. In particular, pages 685 to 697 of the aforementioned Volume 4, Second Edition of Kirk-Othmer's Encyclopedia, containing a detailed disclosure of the type of cement which may be used in the production of the composition of this invention, are incorporated herein by reference.

The oxidated silicon compounds which are used in this invention may be added to any of the active components of this invention. The oxidated silicon compounds may be added in the production of the unsaturated polyester polymer to produce unsaturated polyester silicate polymer as illustrated in U.S. Pat. No. 4,125,498 and used in this invention. The oxidated silicon compounds are present in the hydraulic cement. The oxidated silicon compound may be added to the water-binding components that do not contain an oxidated silicon compound such as synthetic anhydrite, gypsum and burnt lime.

Suitable oxidated silicon compounds which may be used include, but are not limited to, silica, e.g., hydrated silica, silicoformic acid and silica sol, alkali metal silicates, alkaline earth metal silicates, natural silicates containing free silicic acid groups, and mixtures thereof.

The amount of oxidated silicon compound which may be used in the invention is quite varied because it will react with the carboxyl acid or hydroxyl groups in the unsaturated polyester resin or with the water-binding agents and will also serve as a filler. The oxidated silicon compound content, as compared with the total organic content, may vary within the wide range between 80:20 and 10:90.

When there is a high alkali metal silicate content in the reaction mixture, acid-liberating hardeners may be added to the reaction mixture to react with the alkali metal group to form a salt. Halogen or phosphorus-containing compounds are preferred.

Any suitable salt-forming group may be used such as alkylating agents and inorganic or organic acids. Sufficient amount is added to react with the alkali metal group or alkaline earth metal groups in the silicates to produce an alkali metal salt. The organic salt-forming compound may contain groups of the kind which form salt groups in the presence of alkali silicates, for example,

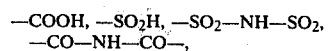

and also phenolic OH-groups. Two or more of the aforementioned groups can also be present.

Suitable hardeners include mineral acids, hydrogen-containing salts of mineral acids, organic acids and polyfunctional and monofunctional alkylating agents. Further examples of acid-liberating hardeners may be found in DAS No. 1,205,087; Dutch Auslegeschrift No. 67/03743; German Pat. No. 1,178,586; and U.S. Pat. No. 3,480,592. Various salt-binding agents may also be used in combination.

Surface-active additives (emulsifiers and foam stabilizers) may also be used according to the invention. Suitable emulsifiers are, e.g., the sodium salt of ricinoleic sulphonates or of fatty acids or salts of fatty acids with amines, e.g., oleic acid diethylamine or stearic acid diethanolamine. The commercially available soaps and detergents may be used. Other surface-active additives are alkali metal or ammonium salts of sulphonic acids, e.g., dodecylbenzene sulphonic acid or dinaphthyl methane disulphonic acids or fatty acids, e.g., ricinoleic acid, or of polymeric fatty acids. Surfactants such as sodium dioctyl sulfosuccinate, potassium dioctyl sulfosuccinate and dioctyl calcium sulfosuccinate may also be used.

The foam stabilizers used are mainly water-soluble polyester siloxanes. These compounds generally have a polydimethylsiloxane group attached to a copolymer of ethylene oxide and propylene oxide. Foam stabilizers of this kind have been described. e.g., in U.S. Pat. No. 3,629,308. These additives are preferably used in quantities of from 0% to 20%, based on the reaction mixture.

Further examples of surface-active additives, foam stabilizers, cell regulators, stabilizers, flame-retarding substances, plasticizers, dyes, fillers and fungicidal and bacteriocidal substances which are utilized for polyurethane foams, but may also be used in this invention, may be found in Kunststoff-Handbuch, Volume VI; published by Vieweg and Hochtlen, Carl-Hanser-Verlag, Munich, 1966, e.g., on pages 103 to 113. The halogenated paraffins and inorganic salts of phosphoric acid are the preferred fire-retardant agents.

SUMMARY OF THE INVENTION

The process for the production of polyester silicate plastics products is simple. It is merely necessary for the components to come together; for example, an unsaturated polyester resin, a catalytic amount of an initiator, a water-binding agent containing an oxidated silicon compound and water are mixed simultaneously, after which the mixture generally hardens in a short period of time.

I have discovered that an oxidated silicon compound will react chemically with organic hydroxyl groups and/or carboxyl acid groups which are present in unsaturated polyester resins. The oxidated silicon compounds will also react chemically and/or function as fillers with the water-binding components.

The preferred method to producce polyester silicate plastics is to mix Component (a) (an unsaturated linear polymer in a liquid monomer that is capable of copolymerizing with the linear polymer, and optionally containing a catalyst (promoter)) with Component (b) and Component (c); then to add Component (d) (water optionally containing surface-active additives) while agitating for a short period of time. The mixture forms a soft, workable mixture, then in a short period of time, it hardens into a solid mass.

The components may be mixed in any suitable manner; they may be mixed simultaneously; Components (a) and (c) may be mixed, then Components (b) and (d) admixed; Components (b), (c) and (d) may be mixed, then Component (a) admixed; Components (a), (b) and (c) may be mixed, then Component (d) admixed; also Components (a), (c) and (d) may be mixed, then Component (b) admixed. Component (d) may contain from 0% to 20% by weight, based on the weight of the mixture, of surface-active additives, to improve the emulsifying of water into the mixture and to aid in regulating and stabilizing the foam when a blowing agent is used.

The reactions of this invention may take place under any suitable physical conditions. While many of the reactions will take place acceptably at ambient temperature and pressure, better results may be obtained in some cases at somewhat elevated temperatures and pressures. The reations are somewhat exothermic and may elevate the temperature of the mixture. The reactants are preferably mixed at room temperature although any suitable temperature in the range of 0° C. to 150° C. may be employed, preferably between 20° C. and 100° C. In certain cases where the temperature of the mixture does not rise sufficiently to activate the initiator, it may be necessary to heat the mixture. In cases where a blowing agent is used, it is necessary for the temperature to rise above the evaporating temperature of the blowing agent.

The ratios of the essential reactants and optional reactants which lead to the polyester silicate plastics of the invention may vary, broadly speaking, within ranges as follows:

a. from 15 to 70 parts by weight of the unsaturated polyester resin;

b. a catalytic amount of an initiator, the amount varying with each initiator;

c. from 30 to 80 parts by weight of a water-binding agent containing, or mixed with, an oxidated silicon compound;

d. from 25% to 100% by weight of water, based on the weight of Component (c), the water-binding agent;

e. from 0% up to 20% by weight of surface-active additives, based on Components (a), (c) and (d);

f. from 0% up to 50% by weight of a blowing agent, based on Components (a), (c) and (d);

g. from 10% up to 80% by weight of an oxidated silicon compound, based on Components (a) and (b) and added with Component (d);

h. from 0% up to the equivalent mols of alkali metal atoms in the mixture of reactants of an acid-liberating hardener.

By the process of this invention, particularly high quality products are obtained. The hardening process proceeds more rapidly when it is carried out at temperatures between 40° C. and 100° C. The products are usually hard as stone, but, on the other hand, are highly elastic and, hence, highly resistant to impact and breakage. If the quantity of heat which is liberated during the reaction between the components is not sufficient to obtain optimum properties, mixing can be readily carried out at elevated temperature, for example, temperatures of from 40° C. to 100° C. The mixing may take place at ambient temperatures, then the formed product can be heated to from 40° C. to 100° C. if curing time needs to be shortened.

In special cases, mixing can also be carried out under pressure at temperatures above 100° C., up to about 150° C., in a closed container while utilizing a blowing agent or steam, so the expansion occurs, accompanied by foam formation, as the material issues from the container.

Generally, production of the foams in accordance with the invention is carried out by mixing the described reaction components together with a blowing agent, either in one stage or in several stages in a batch-type or continuous mixer, and allowing the resulting mixture to foam and harden in molds or on suitable substrates, generally outside of the mixture. The necessary reaction temperature, amounting to between about 0° C. and 150° C. and preferably between 20° C. and 130° C., can either be achieved by preheating one or more reaction components before the mixing process or by heating the mixer itself or by heating the reaction mixture prepared after mixing. Combinations of these or other procedures for adjusting the reaction temperature are, of course, also suitable.

For any given recipe, the properties of the resulting foams, for example, their moist density, is governed to some extent by the parameters of the mixing process, for example, the shape and rotational speed of the stirrer, the shape of the mixing chamber, etc., and also the reaction temperature selcted for initiating foaming. The dried foams can have closed or open cells, but in most cases, they are open-celled. The compression strength obtained acccording to the invention depends, to a large extent, on the proportions in which the starting components are mixed and the resulting density, e.g., densities of between 200 and 600 Kg/m$^2$ and compression strength of 10 to 100 Kg. wt./cm$^2$.

Generally, production of the solid products in accordance with the invention is carried out by mixing the described reaction components together, without a blowing agent, either in one stage or in several stages in a batch-type or a continuous mixer and allowing the resulting mixture to harden in molds or on suitable substrates, generally outside the mixer, the necessary reaction temperature amounting to between 0° C. to 150° C. and preferably between 20° C. and 150° C. The temperature necessary during the curing stage mainly depends on the temperature range in which the initiator functions properly. The desired temperature may be obtained by the use of an outside heat source. Usually ambient temperature is satisfactory. The products produced are hard as stone, but elastic, and are highly resistant to impact and breakage. The curing time generally increases with additives.

In one preferred procedure, foaming is accompanied by hardening, for example, by preparing the reaction mixture in a mixing chamber and simultaneously adding the readily volatile blowing agent which may be, for example, dichlorodifluoromethane, trichlorofluoromethane, butane, isobutylene or vinyl chloride, so that, providing it has a suitable temperature, the reaction mixture issuing from the mixing chamber simultaneously foams through evaporation of the blowing agent and hardens to its final foam from under the effect of the initiator and water-binding component. Said foam optionally contains emulsifiers, foam stabilizers and other additives. In addition, the initially still liquid reaction mixture can be expanded into a foam by the introduction of gases, optionally under pressure, such as air, methane, CF$_4$ and noble gases, the resulting foam being introduced into the required mold and hardened therein. Similarly, the mixture without water, optionally containing foam stabilizers such as surfactants, foam formers, emulsifiers, and, optionally other organic or inorganic fillers or diluents, may initially be converted by blowing gas into a foam and the resulting foam's subsequently being mixed in the mixer with water and other components and the resulting mixture's being allowed to harden. The water may be preheated and added to the rest of the mixed components and thus hardened while foaming.

Instead of blowing agents, it is also possible to use inorganic or organic finely divided hollow bodies such as expanded hollow beads of glass or plastics, expanded clay, straw and the like, for producing foams.

The foams obtainable in this way can be used, if desired, either in their dry or their moist form after a compacting or tempering process which is optionally carried out under pressure, as thermal- and sound-insulating materials, cavity filling, building materials with outstanding resistance to solvents and favorable flame behavior, packaging material and for floatation in boats. Then can also be used as lightweight bricks or in the form of sandwich elements, for example, with metal- or wood-covering layers, in house, vehicle and aircraft construction. It may be produced in the form of sheets to be used for siding on houses.

The components may be combined simultaneously with the addition, at a predetermined temperature, of the blowing agent, for example, a halogenated hydrocarbon, which is capable of evaporation or gas formation at the predetermined temperature. The initial liquid mixture formed can be used not only for producing uniform foam or nonuniform foams containing foamed or unfoamed fillers, but it can also be used to foam through any given webs, woven fabrics, lattices, structural elements or other permeable structures of foamed materials, resulting in the formation of composite foams with special properties, for example, favorable flame behavior, which may optionally be directly used as structural elements in the construction, furniture, boat or vehicle and aircraft industries.

The so-called pot life during which the mixture remains in a workable state depends mainly on the chemical nature of, and proportions of, the components used; it may vary from 0.2 seconds to about 12 hours. Mixing of components is generally carried out immediately before the molding or shaping process. The so-called pot life also varies with the stage in which the initiator is added, the temperature, the concentration of the initiator, the type of initiator used and whether or not a catalyst is used with the initiator. The water-binding component's hardening time is greatly affected by temperature; elevated temperature decreases the hardening time.

By virtue of the behavior of the reaction mixture, the process according to the invention is provided with a number of potential utilities, either as homogenous or as porous materials. A few fields of application are outlined by way of examples in the following paragraphs. The water present in the hardened mixtures may be left in the mixtures as a required constituent of the foam. To protect the foam against the elimination of water, suitable coatings or a water-impermeable layer may be use. All or only part of the water may be removed by suitable drying techniques, for example, in a heating cabinet or oven or with the use of hot air, infrared heating, ultrasonic heating or high-frequency heating.

The foaming reaction mixture containing the blowing agent can be coated, for example, onto any given warm, cold or even IK- or HF-irradiated substrates, or after passing through the mixer, it can be sprayed with compressed air, or even by the airless proess, onto these substrates on which it can foam and harden to give a filling or insulating and protective coating. The foaming reaction mixture or unfoamed reaction mixture can also be molded, cast or injection-molded into cold or heated molds and allowed to harden in these molds, whether relief or solid or hollow molds. This can be accomplished, if desired, by centrifugal casting at room temperature, or at temperatures of up to 200° C and, if desired, under pressure. Strengthening elements may be used, whether in the form of inorganic and/or organic or metallic wires, fibers, webs, foams, woven fabrics, skeletons, etc. This can be done, for example, by the fiber-mat impregnating process or by process in which reaction mixtures and strengthening fibers are applied together to a mold, for example, by means of a spray unit. The moldings obtainable in this way can be used as structural elements such as in the form of optionally foamed sandwich elements produced either directly or subsequently by lamination with metal, glass, wood, plastics, etc., In this case, the favorable flame behavior of the foams in their moist or dry form is of particular advantage; however, they can also be used as hollow bodies such as containers for products that may have to be kept moist or cool, as filter materials or exchangers, as supports for catalysts or active substances, as decorative elements, as parts of furniture and as cavity fillers. They can also be used in the field of pattern and mold design, as well as in the production of molds for casting metals.

The foamed and unfoamed reaction mixtures can be used together to produce strong, light-weight, insulated, water proof, flame-resistant panels for use in construction of, e.g., walls, doors, cabinets, roofing, flooring, etc., by spreading a layer of the unfoamed mixture on the outside, optionally reinforced with fiberglass, wire mesh, woven fiberglass, woven fabric, etc., then by applying a layer of foaming mixture, and as it solidifies, applying another outer layer of the unfoamed mixture. The outside layer may be decorated as desired or may be applied to wood, metal, plastic, marble, etc. The foamed and unfoamed mixtures can be used in construction engineering, in civil engineering and in road building, for erecting walls, igloos, seals, for filling joints, plastering, flooring, insulation, decoration, boat and ship construction and as a coating for metals, wood, concrete, plastics, etc., and as screed and covering material. They can also be used as adhesives or mortars, as casting compositions, optionally filled with inorganic or organic fillers. Auxiliaries may, if desired, be used in, or subsequently introduced into, the reaction mixture, such as emulsifiers, surfactants, dispersants, odorants, hydrophobizing substances, etc.

When a technique of foaming in a mold under pressure is employed, molded parts with dense marginal zones and completely non-porous smooth surfaces can be obtained.

The process according to the invention is particularly suitable for in site foaming on the building site and for unfoamed use on the building site. Thus, any types of hollow mold, of the kind made by framework in the usual way, can be cast or filled with the foamed and unfoamed mixture. The reaction mixtures can also be used to fill cavities, gaps and cracks, giving a firm bond between the joined materials. Insulating internal plasters can also be readily produced by spraying on the foamed reaction mixture. In many cases, the materials obtained can be used instead of wood or hard-fiber boards. They can be sawed, rubbed down, sanded, nailed, drilled or milled, and, in this way, can be worked and used in a number of different ways. The foamed or unfoamed products can be subsequently lacquered, metallized, coated, laminated or galvanized, subject to vapor deposition, or may be bonded or flocked in their most or their dry form or in impregnated form.

The optionally filled moldings can be further modified in their properties by thermal after-treatment, oxidation processes, hot-pressing, sentering processes or surface melting or other consolidation processes.

Suitable mold materials include inorganic and/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonates, etc.

The foams or solid products obtained in accordance with the invention can be surface-treated or, when they are in the form of substantially permeable structures such as open-cell forms or porous materials, can even be treated by centrifuging, vacuum treatment, by having air blown through or by being rinsed with (optionally heated) liquids or gases which remove the water present. Examples are: methanol, ethanol, acetone, dioxan, benzene, chloroform and the like. Drying with air, $CO_2$ or super-heated steam can be done. Similarly the moist or dry products can also be after-treated by rinsing with, or impregnating with, aqueous or non-aqueous acid, neutral or basic liquids or gases such as hydrochloric acid, phosphoric acid, formic acid, acetic acid, ammonia, amines, organic or inorganic salt solutions, lacquer solutions, solutions of polymerizable or already polymerized monomers, dye solutions, galvanizing baths, solutions of catalysts or catalyst preliminary stages, odorants and the like.

The new composite materials are particularly suitable for use as structural materials because they show tensile and compressive strength, are tough, rigid and, at the same time, elastic, show high permanent dimensional stability when hot and are substantially non-inflammable. The unfoamed reaction mixture may be utilized in the production of products similar to those produced by the polyester resins, such as boats, construction panels, automobile parts and bodies, airplane structural parts, furniture, solid art objects, cavity filling, plastering materials, road-building materials, coating materials for metals, wood, plastics, flooring, etc., concrete, etc., adhesive material, mortar, sealant, and for use in erecting walls. The unfoamed reaction mixture may be sprayed on or be applied by a tool such as a trowel or brush to layers of fiberglass cloth or multiple layers of wire mesh, such as chickenwire, to produce products like boats which have hulls which are tough, have good tensile and compressive strength, are rigid and, at the same time, elastic, show high permanent dimensional stability and good salt-water resistance. This material is very similar, in equal thickness and equal content of reinforcing materials, to the strength and durability of polyester boat resins, but is less expensive. This material will produce a boat of much less weight, compared to a ferro-cement boat, while using equivalent reinforcing material. In most cases, this material can be used in place of polyester resins or concrete with less expense and/or less weight.

Fillers in the form of particulate or powdered material can be additionally incorporated into the mixtures of unsaturated polyester resins, water-binding agents and water.

Suitable fillers include solid and/or foamed inorganic or organic substances, for example, in the form of powders, granulates, wire, fibers, dumb bells, crystallites, spirals, rods, beads, hollow beads, foam particles, webs, pieces of woven fabric, knit fabric, ribbons, pieces of film etc., for example, of dolomite, chalk, alumina, asbestos, basic silicas, sand, gravel, talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay particles, hollow glass beads, glass powder, lava and pumice particles, wood chips, sawdust cork, particles of filled or unfilled, foamed or unfoamed, stretched or unstretched organic polymers, including plastics and rubber waste. Of the number of suitable organic polymers, the following, which can be present, for example, in the form of powder, granulate, foamy articles, hollow beads, foamable or unfoamed particles, fibers, ribbons, woven fabric, webs, etc., are mentioned purely by way os example: polystyrene, polyethylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyesters, polyurethanes, polyimides, polyamides, polyethers, polysulphones, polycarbonates, and, of course, any copolymers as well. Inorganic fillers are preferred.

Generally, the composite materials according to the invention can be filled with considerable quantities of fillers without losing their valuable property spectrum. The amount of fillers can exceed the amount of the components. In cases where higher amounts of fillers are used, it may be advisable to add water in order to obtain sufficient working properties. Coarse fillers can be used in wet form, powdered filler such as, e.g., chalk, alumina, dolomite, calcium hydroxide, magnesium carbonate, sand and calcium carbonate, can be used also as an aqueous suspension.

Expanded clay may be used as a water-binding agent in in this invention and will produce a polyester silicate plastic which is strong, light weight, high concrete and may be used for example, as panels in the construction field.

The object of the present invention is to provide a novel process to produce polyester silicate plastics. Another object is to produce novel polyester silicate solid or cellular solid products. Still another object is to produce novel, fine cellular solid products of relatively low cost, light weight, high strength, with good flame resistance and dimensional stability when heated. Another object is to produce novel solid polyester silicate plastics that may be used in the construction, boat, automobile and aircraft industries. Another object is to produce novel solid or cellular solid products that may be used for sound and thermal insulation, structural purposes, shock-resistant packaging, coating of wood, metals and plastics, as adhesives, casting material, putty, etc.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of polyester silicate plastics. Parts and percentages are by weight unless otherwise indicated.

EXAMPLE 1

Component (a): unsaturated polyester resin containing 2 mols of phthalic anhydride, 1 mol of maleic anhydride and 3.25 mols of propylene glycol, and 30% styrene with 0.005 to 0.01 part by weight of cobalt naphthenate;
Component (b): 0.01 part by weight of methyl ethyl ketone peroxide;
Component (c): Portland cement;
Component (d): water;

About 1 part by weight of Component (a) is mixed with 2 parts by weight of Component (c); then Component (b) 0.7 part by weight of Component (d) are admixed at ambient temperature and pressure. The mixture is then poured into a mold and hardens in a few minutes.

EXAMPLE 2

Components (a), (b) and (c) of Example 1 are mixed; then 0.25 parts by weight of a blowing agent, trichlorofloromethane, is admixed. 0.75 Part by weight of water containing 3% soap and at 50° C. is added to the mixture while rapidly stirring. The mixture expands 3 to 10 times its original volume and hardens into a cellular solid polyester silicate product. The soap is a sodium salt of a fatty acid.

EXAMPLE 3

Component (a): 3 parts by weight of an unsaturated polyester resin containing about 2 mols of adipic acid, 1 mol of fumaric acid, 0.5 mol of ethylene glycol and 1.5 mols of propylene glycol, 20% styrene, 10% methyl methacrylate and 50 to 100 ppm of cobalt metal in the form of cobalt naphthenate;
Component (b): methyl ethyl ketone peroxide, 0.005 to 0.02 part by weight;
Component (c): 2 parts by weight of burnt lime and 1 part by weight of hydrated silica;
Component (d): 0.5 part by weight of water;

Components (a), (b), (c) and (d) are admixed simultaneously at 30° C. and the mixture hardens in 10 to 20 minutes, thereby producing a tough, solid polyester silicate plastic product.

EXAMPLE 4

Components (a), (b) and (c) of Example 3 are mixed with 0.75 part by weight of methylene chloride; then 0.75 part by weight of water at 60° C. and containing 3% detergent is added while rapidly stirring. The mixture expands 3 to 10 times its original volume and hardens, thereby producing a rigid, cellular solid polyester silicate plastic product. The detergent is a sodium salt of ricinoleic sulphonates.

EXAMPLE 5

Component (a): 2 parts by weight of unsaturated polyester resin containing diallyl phthalate, 20% styrene, 10% vinyl acetate and 100 ppm of cobalt metal in the form of cobalt naphthenate;
Component (b): catalytic amount of methyl ethyl ketone peroxide;
Component (c): 4 parts by weight of gypsum;
Component (d): 2 parts by weight of water containing 1% sodium dioctyl sulfosuccinate and 1 part by weight of hydrated silica;

Components (a), (b) and (c) are mixed thoroughly, then Component (d) is admixed. The mixture hardens in 0.5 to 5 minutes, thereby producing a tough, hard, solid polyester silicate plastic.

EXAMPLE 6

Components (a), (b) and (c) of Example 5 and mixed with 0.8 part by weight of cis,trans ethylene dichloride; then 2 parts by weight of water containing b 2% potassium dioctyl sulfosuccinate at 65° C. are admixed rapidly, and in a few seconds, the mixture expands 3 to 10 times its original volume. In 1 to 3 minutes, it hardens, thereby producing a rigid, cellular solid polyester silicate plastic.

EXAMPLE 7

Component (a): unsaturated polyester resin produced by reacting 2 mols of sebacic acid, 1 mol of fumaric acid and 3.1 mols and diethylene glycol, and containing 15% styrene, 5% vinyl acetate, 5% methacrylic acid and 0.01% cobalt naphthenate;
Component (b): methyl amyl ketone peroxide, catalytic amount;
Component (c): calcium oxide containing 25% Portland cement;
Component (d): water containing 3% detergent (sodium salt of ricinoleic sulphonates).

2 Parts by weight of Component (a), 0.02 parts by weight of Component (b), 3 parts by weight of Component (c) and 1 part by weight of Component (d) are mixed at 60° C., and in about 5 to 20 minutes, the mixture hardens, thereby producing a stone-hard polyester silicate plastic.

EXAMPLE 8

Component (a): 4 parts by weight of an unsaturated polyester resin produced by reacting 2 mols of adipic acid, 0.5 mol of phthalic anhydride, 1 mol of fumaric acid and 4 mols of propylene glycol and containing 10% triallyl cyanurate, 10% divinyl benzene, 10% styrene and about 100 ppm of cobalt in the form of cobalt hexanoate;
Component (b): 0.02 part by weight of methyl ethyl ketone peroxide;
Component (c): 6 parts by weight of rapid-setting cement;
Component (d): 2 parts by weight of water containing 3% soap (sodium salts of fatty acids);

Components (a), (b), (c) and (d) are simultaneously added to a mixer with a fast stirrer and are stirred for about 15 seconds, then poured into a mold. The mixture hardens in 1 to 5 minutes, thereby producing a rock-hard polyester silicate plastic.

EXAMPLE 9

The components of Example 8 are added to a mixer with a rapid stirrer at 50° C. to 60° C.; then immediately following their addition, 1 part by weight of methylene chloride is added, and in a few seconds, the mixture expands from 3 to 10 times its original volume and is poured into a mold. The mixture hardens while foaming, thereby producing a rigid, tough, cellular solid polyester silicate plastic.

EXAMPLE 10

Component (a): 1 part by weight of a commercial boat resin containing a cobalt catalyst;
Component (b): catalytic amount of methyl ethyl ketone peroxide;
Component (c): rapid-setting cement, 4 parts by weight;
Component (d): water containing a commercial detergent (sodium salts of ricinoleic sulphonates):

Components (a), (b) and (c) are mixed, then simultaneously added with Component (d) to a mixer with a rapid stirrer. They are mixed for about 15 seconds, then poured into a mold where the mixture hardens in 1 to 5 minutes, thereby producing a rock-hard, tough polyester silicate plastic.

EXAMPLE 11

Components (a), (b) and (c) of Example 10 are mixed with 1 part by weight of ethylene dichloride; then Component (d) of Example 10° at 70° C. is added to the mixture in a mixer with a rapid stirrer and stirred for about 15 seconds. The mixture expands 3 to 10 times its original volume and is poured into a mold where it hardens in 1 to 5 minutes, thereby producing a rigid, hard, tough polyester silicate cellular plastic product.

EXAMPLE 12

Component (a): 2 parts by weight of a commercial unsaturated polyester resin ("TITAN CASTING RESIN");
Component (b): 0.01 part by weight of an initiator (Titan Catalyst "P" produced by California Titan Products, Inc.)
Component (c): 4 parts by weight of a water-binding agent, as listed below*, and 1% by weight of fine granular silicoformic acid;
Component (d): 1.5 parts by weight of water containing 3% commercial detergent and 1 part by weight of hydrated silica; the detergent is a sodium salt of ricinoleic sulphonates;

Components (a), (b), (c) and (d) are mixed simultaneously at ambient temperature, then poured into a mold to harden, thereby producing a rock-hard, tough, polyester silicate plastic product.
*Component (c) (water-binding agents): (1) gypsum; (2) Portland cement; (3) burnt lime; (4) 10% burnt lime and 90% Portland cement; (5) synthetic anhydrite; (6) mild-burnt cement; (7) sulphate-resistant cement; (8) brick cement; (9) pozzolan cement; (10) lime cement; (11) gypsum cement; (12) calcium sulphate cement; (13) gypsum cement; (14) blast-furnace Portland cement; (15) natural cement; (16) quick-setting cement; (17) Portland cement.

EXAMPLE 13

About 0.05 part by weight of a foam regulator, diazobicyclooctane polyester polysiloxane is added to the components of Example 12, then immediately mixed and foamed with compressed air, 20 to 30 lbs./sq. in., and forced into a mold with compressed air and hardened under pressure in the closed mold, thereby producing a rigid, tough, cellular solid polyester silicate plastic product. The hardening time varies with the water-binding agent and the temperature.

EXAMPLE 14

Component (a): 2 parts by weight of commercial laminating resin containing a cobalt catalyst;
Component (b): catalytic amount of methyl ethyl ketone peroxide;
Component (c): 6 parts by weight of Portland cement;
Component (d): 2 parts by weight of water containing 3% of a commercial detergent (sodium salts of ricinoleic sulphonates):

Components (a), (b) and (c) are mixed, then Component (d) is added at ambient temperature and thoroughly mixed. The mixture is first applied to a layer of fiberglass cloth, then applied to 2 other layers of fiberglass cloth at ambient temperature by the use of a trowel to produce a panel which is approximately one-fourth-inch thick. The panel is warmed to 30° C. to 40° C. and hardens in 15 to 30 minutes, thereby producing a rock-hard, tough polyester silicate panel. The panel, after curing for 24 to 48 hours, has approximately the strength and elasticity of a similar polyester fiberglass reinforced panel. The panels are flame-resistant, abrasion-resistant, salt-water-resistant and are somewhat elastic.

EXAMPLE 15

Component (a): 2 parts by weight of an unsaturated polyester containing 50% diallyl phthalate, 10% diallyl fumarate, 10% diallyl benzene phosphonate, 10% methallyl methacrylate and 20% styrene containing 0.5% diethyl aniline;
Component (b): 0.05 part by weight of acetyl benzoyl peroxide;
Component (c): 2 parts by weight of Portland cement and 2 parts by weight of sand;
Component (d): 1 part by weight of water containing 3% soap;

Components (a), (b), and (c) are mixed, then Component (d) is thoroughly admixed. The mixture is poured into a heated mold (30° C. to 40° C.) where the mixture hardens in 3 to 15 minutes, thereby producing a rock-hard, tough polyester silicate plastic product. The soap used in the example is oleic acid diethylamine.

EXAMPLE 16

Component (a): 2 parts by weight of an unsaturated polyester resin containing 1 part by weight of the polyester in Example 1, 0.5 part by weight of diallyl phthalate, 0.25 part by weight of acrylonitrile and 0.25 part by weight of methyl methacrylate;
Component (b): 0.05 part by weight of potassium persulfate;
Component (c): 3 parts by weight of expanded clay granules;
Component (d): 1 part by weight of water containing 3% detergent (sodium salt of ricinoleic sulphonates)

Components (a) and (c) are mixed, then Components (b) and (d) are added and thoroughly mixed, then poured into a mold to make a panel at 30° C. to 40° C. The mixture hardens in 15 to 30 minutes, thereby producing a rigid, tough polyester silicate panel.

EXAMPLE 17

Component (a): 2 parts by weight of an unsaturated polyester resin listed below, containing a cobalt catalyst;
Component (b): catalytic amount of methyl ethyl ketone peroxide;
Component (c): 4 parts by weight of the water-binding agent listed below;
Component (d): 2 parts by weight of water containing 3% soap;
Additive: 2 parts by weight of granular foamed particles of polyisocyanate silicate as produced by the process in U.S. Pat. No. 4,097,424;

Components (a), (b) and (c) are mixed, then Component (d) and the additive are added and thoroughly mixed. The mixture is poured into a mold where it hardens to produce a rigid, lightweight, strong polyester silicate plastic.

| Example | Component (a) | Component (c) |
|---|---|---|
| a | as in Example 1 | Portland cement |
| b | as in Example 3 | calcium sulfate cement |
| c | as in Example 5 | mortar cement |
| d | as in Example 7 | pozzolan cement |
| e | as in Example 8 | lime cement |

-continued

| Example | Component (a) | Component (c) |
|---|---|---|
| f | as in Example 10 | 50% gypsum, 50% silica |
| g | as in Example 12 | rapid-setting cement |
| h | as in Example 14 | 50% burnt lime, 50% Portland cement |
| i | as in Example 1 | sulphate-resistant cement |

The soap used in the examples is stearic acid diethanolamine.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto, to enhance or otherwise modify the reaction and products. Other modifications of my invention will occur to those skilled in the art upon reading my disclosure. Those are intended to be included within the scope of my invention, as defined in the appended claims.

I claim:
1. The process for the production of polyester silicate plastic by mixing the following components:
   (a) 15 to 70 parts by weight of an unsaturated polyester resin which consists of a solution of an unsaturated linear polymer in a liquid monomer that is capable of copolymerizing with the linear polymer;
   (b) a catalytic amount of a free-radical initiator;
   (c) 30 to 80 parts by weight of an inorganic water-binding agent, said water-binding agent being capable of absorbing water to form a solid or a gel and being based on the weight of Components (a) and (b);
   (d) 1 to 4 parts by weight of water to each 4 parts by weight of the inorganic water-binding agent, with the proviso that Component (d) is added last and that an oxidated silicon compound is added with one or more of the components.
2. The process of claim 1 wherein the water-binding agent is selected from the group consisting of hydraulic cement, synthetic anhydrite, gypsum or burnt lime.
3. The process of claim 1 wherein the initiator is selected from the group consisting of an organic peroxide, an inorganic peroxide, alkali metal persulfate, ammonium persulfate, a redox system and a peroxide with a metal catalyst.
4. The process of claim 1 wherein from 0% up to 50% by weight, based on the reaction mixture, of a chemically-inert blowing agent, boiling within the range of from −25° C. to 80° C., is added, and the reaction mixture is allowed to react to completion while foaming.
5. The process of claim 1 wherein the mixture contains from 0% up to 20% by weight of surface-active additives.
6. The process of claim 1 wherein inorganic or organic particulates or pulverulent materials are added to the reaction mixture.
7. The product of the process of claim 1.
8. The process of claim 1 wherein the oxidated silicon compound is selected from the group consisting of silica, alkali metal silicate, alkaline earth metal silicates, natural silicates containing free silicic acid groups and mixtures thereof, and added in the ratio of oxidated silicon compound to organic components of 70:30 to 20:80 parts by weight.
9. The product, foamed polyester silicate plastic, as produced by the process of claim 4, wherein up to 50% by weight, based on the reaction mixture, of the chemically-inert blowing agent is added.

* * * * *